US012765507B2

(12) United States Patent
Smith

(10) Patent No.: US 12,765,507 B2
(45) Date of Patent: Oct. 20, 2026

(54) RIVALRY LITTER BOXES DEVICE

(71) Applicant: Craig Smith, Alpharetta, GA (US)

(72) Inventor: Craig Smith, Alpharetta, GA (US)

(*) Notice: Subject to any disclaimer, the term of this patent is extended or adjusted under 35 U.S.C. 154(b) by 0 days.

(21) Appl. No.: 19/187,410

(22) Filed: Apr. 23, 2025

(65) Prior Publication Data

US 2026/0191162 A1 Jul. 9, 2026

Related U.S. Application Data

(60) Provisional application No. 63/743,406, filed on Jan. 9, 2025.

(51) Int. Cl.
*A01K 1/01* (2006.01)

(52) U.S. Cl.
CPC .................................. *A01K 1/0107* (2013.01)

(58) Field of Classification Search
CPC ............................ A01K 1/0107; A01K 1/0114
USPC ................................ 119/161, 165; D30/161
See application file for complete search history.

(56) References Cited

U.S. PATENT DOCUMENTS

D125,285 S * 2/1941 Ohlhaver .................... D7/619.1
4,541,360 A 9/1985 Higgins
4,819,580 A 4/1989 Foldes
D363,369 S * 10/1995 Hoth ............................ D30/161
5,590,623 A 1/1997 Toole
5,992,350 A 11/1999 Manzo
D699,900 S * 2/2014 Popkin .......................... D30/118
D703,877 S * 4/2014 Popkin .......................... D30/118
D728,168 S * 4/2015 Richardson ............... D6/707.13
D740,497 S * 10/2015 Richardson ............... D6/707.13
D840,611 S * 2/2019 Takagi .......................... D30/161
D853,057 S 7/2019 Itzhak-Sigron
D891,715 S * 7/2020 Suzuki .......................... D30/161
D955,062 S * 6/2022 Valla ............................ D30/118
11,632,933 B1 * 4/2023 Yona .................... A01K 1/0152 119/165
2009/0314214 A1 * 12/2009 Miller .................. A01K 1/0152 40/1
2016/0029589 A1 * 2/2016 Norman ............... A01K 1/0107 156/60
2021/0051916 A1 2/2021 Weber

* cited by examiner

*Primary Examiner* — Yvonne R Abbott-Lewis
(74) *Attorney, Agent, or Firm* — Brennan, Manna & Diamond, LLC

(57) ABSTRACT

A cat litter box device is disclosed, which is a litter box decorated as a sports stadium or arena. The cat litter box device comprises a body component that is configured in an ovular shape. The body component is shaped like a sports arena or stadium that is used to play football, soccer, cricket, basketball, automotive racing, baseball, and other sports. The device can be available in several sizes and designs to accommodate all cat breeds. The interior area of the device is open to receive cat litter. Further, the device includes an exterior with a low profile to ensure a cat can easily enter and exit the box. Additionally, the device has scoreboard areas that can receive stickers or magnets designed as sports team logos.

11 Claims, 3 Drawing Sheets

RIVALRY LITTER BOXES DEVICE

CROSS-REFERENCE TO RELATED APPLICATION

The present application claims priority to, and the benefit of, U.S. Provisional Application No. 63/743,406, which was filed on Jan. 9, 2025, and is incorporated herein by reference in its entirety.

FIELD OF THE INVENTION

The present invention relates generally to the field of cat litter box devices. More specifically, the present invention relates to a modified cat litter box that can have a variety of sports'logos, shapes, and designs. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in cat litter box devices. Generally, standard litter boxes for cats are effective and efficient. However, traditional cat litter boxes are an eyesore when placed in different areas of the home. Additionally, cat owners may be looking for more unique litter boxes for their pets to use. Sports fans may enjoy having all types of memorabilia and decorations within their homes. Thus, the device is intended to offer cat owners a fun way to disguise their cat's litter box to decorate their home.

Accordingly, there is a demand for an improved cat litter box device that allows users to decorate their cat's litter boxes. More particularly, there is a demand for a cat litter box device that can be customized with stickers or magnets to represent different sports teams or other decor.

Therefore, there exists a long-felt need in the art for a cat litter box device that provides users with a cat litter box shaped like a sports stadium or arena. There is also a long-felt need in the art for a cat litter box device that features an open interior area that holds cat litter while the exterior low profile ensures a cat can easily and safely enter and exit the box. Further, there is a long-felt need in the art for a cat litter box device that resembles any type of sport arena or stadium, such as, but not limited to, hockey, basketball, baseball, football, soccer, and much more. Moreover, there is a long-felt need in the art for a device that includes scoreboard areas that can receive stickers or magnets of favorite and rival teams to further decorate the box. Further, there is a long-felt need in the art for a cat litter box device that functions as an effective litter box for cats while offering a way for sports fans to further decorate their homes. Finally, there is a long-felt need in the art for a cat litter box device that includes several sizes and designs to accommodate all cat breeds.

The subject matter disclosed and claimed herein, in one embodiment thereof, comprises a cat litter box device. The device is a modified cat litter box that can have a variety of sports logos, shapes, and designs. The cat litter box device comprises a body component that is configured in an ovular shape or other various shapes. The body component is shaped like a sports arena or stadium that is used to play football, soccer, cricket, basketball, automotive racing, baseball, and other sports. The device can be available in several sizes and designs to accommodate all cat breeds. The interior area of the device is open to receive cat litter. Further, the device includes an exterior with a low profile to ensure a cat can easily enter and exit the box. Additionally, the device has scoreboard areas that can receive stickers or magnets designed as sports team logos.

In this manner, the cat litter box device of the present invention accomplishes all of the foregoing objectives and provides users with a device that allows a user to decorate their cat's litter box with their favorite sports team or their rivals. The device is a cat litter box designed like a sports arena or stadium. The device allows a user to use stickers or magnets to decorate the litter box.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cat litter box device. The device is a modified cat litter box that can have a variety of sports logos, shapes, and designs. The cat litter box device comprises a body component that is configured in an oval-like or rectangular shape or any other suitable shape. Specifically, the body component is shaped like a sports arena or stadium that is used to play football, soccer, cricket, basketball, automotive racing, baseball, and other sports or activities. The device can be available in several sizes and designs to accommodate all cat breeds. The interior area of the device is open to receive cat litter. Further, the device includes an exterior with a low profile to ensure a cat can easily enter and exit the box.

In one embodiment, the cat litter box device allows users to decorate their cat's litter box to avoid it becoming an eyesore in their homes. Further, the cat litter box can be decorated for sports fans as any specific stadium or sports area they desire. Accordingly, users can add stickers or magnets to continuously change the sports teams presented on the device.

In one embodiment, the cat litter box device comprises a body component that is configured in an ovular base shape or any such shape as befits a specific sport arena or stadium, such as rectangular, square, circular, etc. The body component comprises an exterior surface, an interior surface, and a profile which runs along the outer edge of the device. However, the body component can be any suitable shape and size as is known in the art, as long as the body component is sized and shaped to be sat in by any cat breed as is desired by the user.

In one embodiment, the body component is shaped like any sports arena or stadium, as is desired by the user. The different sports include, but are not limited to, football, soccer, cricket, basketball, automotive racing, and baseball. The body component depicts a miniature replica of the general shape of these stadiums, including field/playing area, scoreboard, and bleachers.

In one embodiment, the interior surface of the body component allows for the device to be a litter box. The interior surface of the body component dips below the outer profile of the body component to ensure a scooped-out center, placed where the field or court would be in a traditional sports arena. This scooped-out interior surface allows for cat litter to be filled within the cat litter box device. The outer profile is raised up slightly from this interior surface to ensure that no cat litter spills over onto the ground which the device is placed on.

In one embodiment, the outer profile of the body component contains the place wherein, on a traditional stadium or arena, the bleachers would be placed. This outer profile is raised slightly compared to the rest of the body component. This allows the cat litter to be placed inside without worry of a mess, while also giving the illusion of the raised bleachers in a stadium compared to the actual field or court. This outer profile, however, is still relatively low to the ground, enough so that a cat of any size can easily jump or step over the outer profile to enter the interior surface of the body component.

In one embodiment, the scoreboard feature found within the interior surface or on the outer profile of the body component is made of a plastic or magnetic material. This allows for stickers or magnets, respectively, to be placed on the scoreboard. These stickers or magnets may be any logo for any sports team which is desired by the user. The user may also change the stickers or magnets regularly to keep up with whatever team they desire, whether it be a favorite, rival, or simply current team. Thus, the stickers or magnets can be easily secured to the device and then easily interchanged, as needed.

In one embodiment, the cat litter box device may be any size or shape as is desired by the user, as long as the device is sized and shaped to fit a cat within the interior surface of the body component. This cat litter box device may also come in many different sizes to accommodate for many different breeds of cats.

In one embodiment, the cat litter box device is manufactured from plastic, stainless steel, or other suitable materials as is known in the art, or a combination of such materials.

In yet another embodiment, the cat litter box device comprises a plurality of indicia.

In yet another embodiment, a method of decorating a cat litter box is disclosed. The method includes the steps of providing a cat litter box device comprising a body component with an interior surface and raised outer perimeter. The method also comprises placing the device on the floor of the home. Further, the method comprises filling the interior surface of the body component with cat litter. The method also comprises arranging stickers or magnets on the scoreboard to designate the desired sports team. Finally, the method comprises allowing the cat to use the bathroom within the newly decorated litter box.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
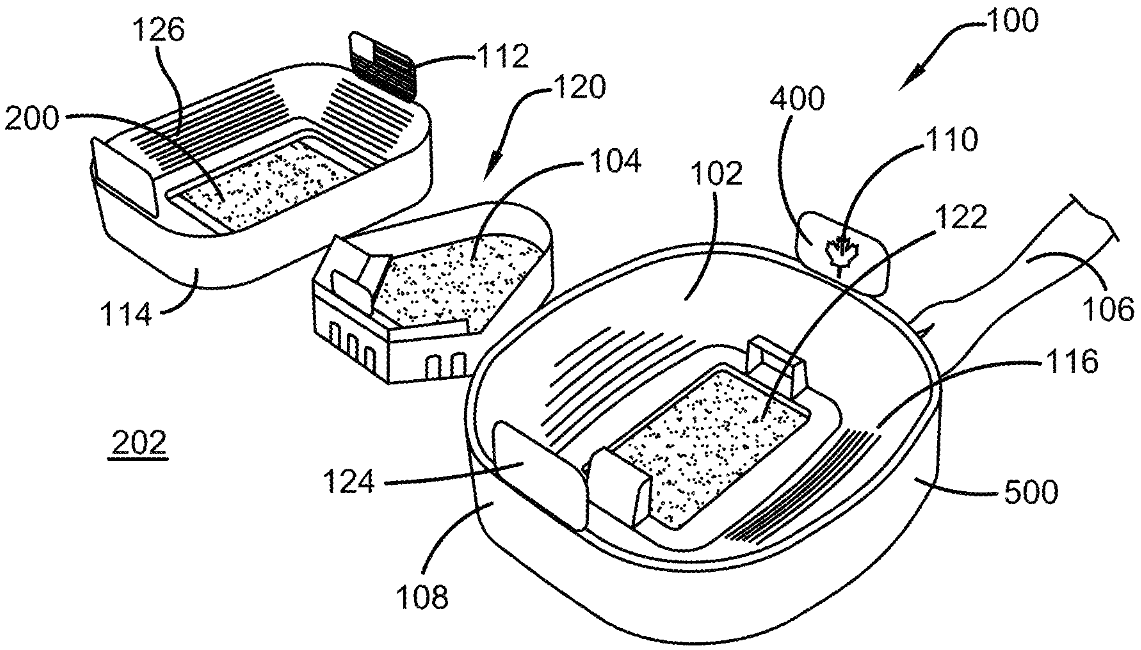
FIG. 1 illustrates a perspective view of one embodiment of the cat litter box device of the present invention showing multiple different shapes of the body component in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a cat litter box device that provides users with a cat litter box shaped like a sports stadium or arena. There is also a long-felt need in the art for a cat litter box device that features an open interior area that holds cat litter while the exterior low profile ensures a cat can easily and safely enter and exit the box. Further, there is a long-felt need in the art for a cat litter box device that resembles any type of sport arena or stadium, such as, but not limited to, hockey, basketball, baseball, football, soccer, and much more. Moreover, there is a long-felt need in the art for a device that includes scoreboard areas that can receive stickers or magnets of favorite and rival teams to further decorate the box. Further, there is a long-felt need in the art for a cat litter box device that functions as an effective litter box for cats while offering a way for sports fans to further decorate their homes. Finally, there is a long-felt need in the art for a cat litter box device that includes several sizes and designs to accommodate all cat breeds.

The present invention, in one exemplary embodiment, is a novel cat litter box device. The cat litter box device comprises a body component that is configured in an ovular shape. Specifically, the body component is shaped like a sports arena or stadium that is used to play football, soccer, cricket, basketball, automotive racing, baseball, and other sports. The interior area of the device is open to receive cat litter. Further, the device includes an exterior with a low profile to ensure a cat can easily enter and exit the box. Additionally, the device has scoreboard areas that can receive stickers or magnets designed as sports team logos or various other media. The device can be available in several sizes and designs to accommodate all cat breeds and users'needs and/or wants.

Referring initially to the drawings, FIG. 1 illustrates a perspective view of one embodiment of the cat litter box device 100 of the present invention. In the present embodiment, the cat litter box device 100 is an improved cat litter box device 100 that provides a user 106 with a cat litter box decorated like a sports arena or stadium. Specifically, the cat litter box device 100 comprises a body component 102 with an interior surface 104. Thus, the body component 102 is appealing to look at and easy to clean with the indented interior surface 104. Further, the body component 102 is easy to move and clean up.

Generally, the cat litter box device 100 allows users 106 to decorate their cat's litter box to avoid it becoming an eyesore in their homes. Further, the cat litter box device 100 can be decorated for sports fans as any specific stadium or sports arena 108 they desire. Accordingly, users 106 can add stickers or magnets 110 to continuously change the sports teams 112 presented on the device 100.

Further, the cat litter box device 100 comprises a body component 102 that is configured in an ovular base shape or any such shape as befits a specific sport arena or stadium 108, such as rectangular, square, circular, etc. The body component 100 comprises an exterior surface 114, an interior surface 104, and a raised outer profile 116 which runs along the outside of the device 100. However, the body component 102 can be any suitable shape and size as is known in the art, as long as the body component 102 is sized and shaped to be sat in by any cat breed 118 as is desired by the user 106.

Additionally, the body component 102 is shaped like any sports arena or stadium 108 as is desired by the user 106. The different sports 120 include, but are not limited to, football, soccer, cricket, basketball, automotive racing, and baseball. The body component 102 depicts a miniature replica of the exact shape of these stadiums 108, including field/playing area 122, scoreboard 124, and bleachers 126.

Figure 2:
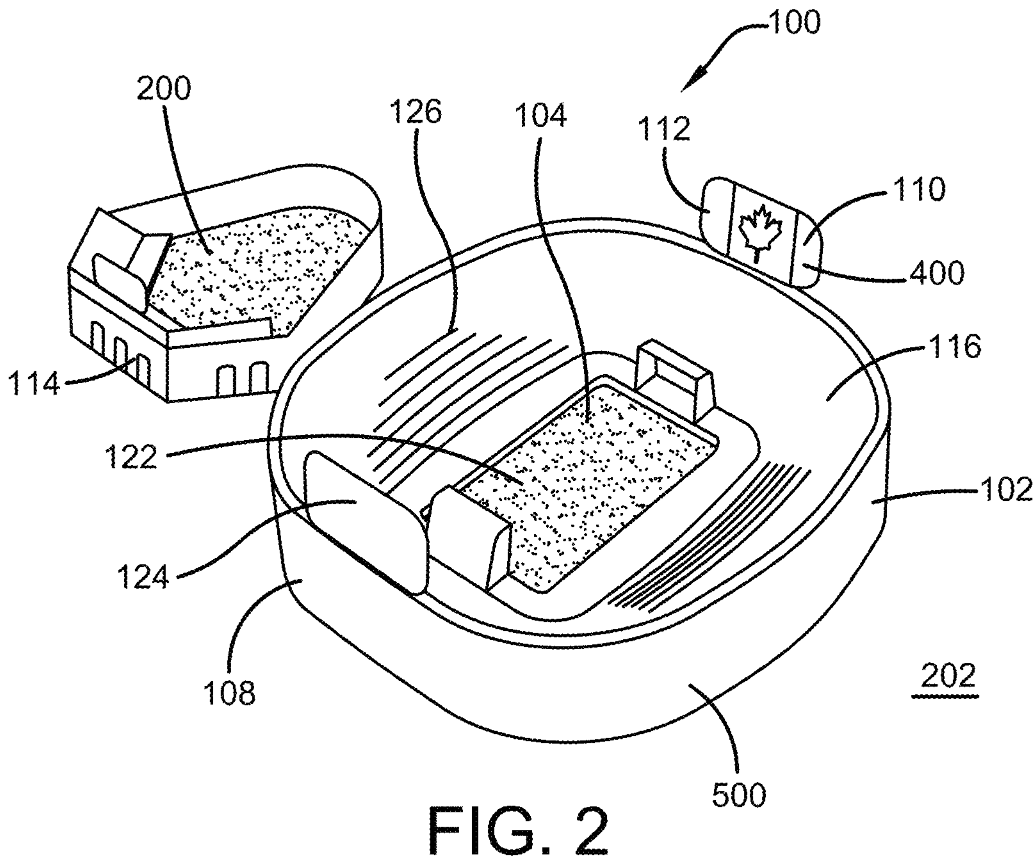
FIG. 2 illustrates a perspective view of one embodiment of the cat litter box device of the present invention showing the interior surface in accordance with the disclosed architecture.

As shown in FIG. 2, the interior surface 104 of the body component 102 allows for the device 100 to function as a traditionally functioning litter box. The interior surface 104 of the body component 102 dips below the raised outer profile 116 of the body component 102 to ensure a scooped-out interior surface 104, placed where the field or court 122 would be in a traditional sports arena 108. This scooped-out interior surface 104 allows for cat litter 200 to fill within the cat litter box device 100. The raised outer profile 116 is raised up slightly from this interior surface 104 to ensure that no cat litter 200 spills over onto the ground 202 which the device 100 is placed on.

Figure 3:
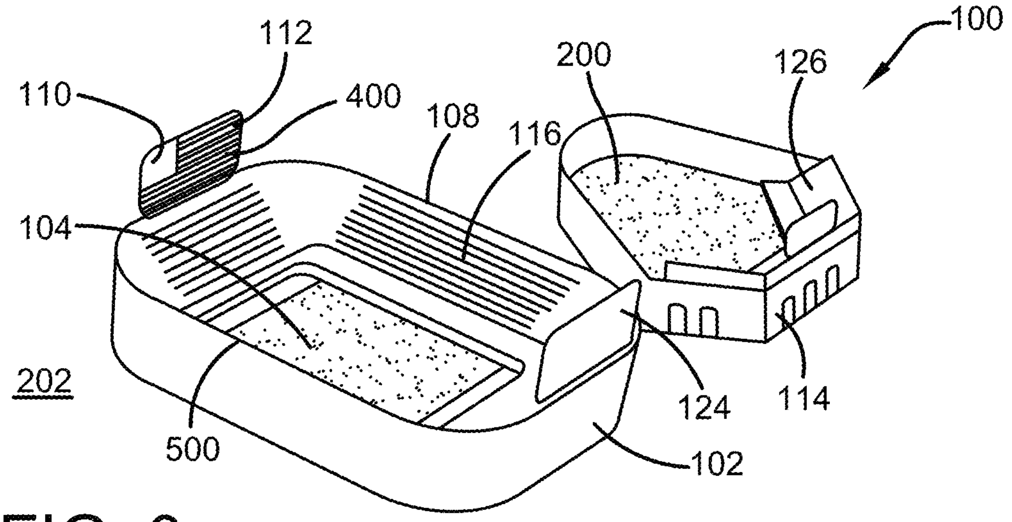
FIG. 3 illustrates a perspective view of one embodiment of the cat litter box device of the present invention showing the raised outer perimeter in accordance with the disclosed architecture.

As shown in FIG. 3, the raised outer profile 116 of the body component 102 contains the place wherein, on a traditional stadium or arena 108, the bleachers 126 would be placed. This raised outer profile 116 is raised slightly compared to the rest of the body component 102. This allows the cat litter 200 to be placed inside without worry of a mess, while also giving the illusion of the raised bleachers 126 in a traditional stadium 108 compared to the actual field or court 122. This raised outer profile 116, however, is still relatively low to the ground 202, enough so that a cat 118 of any size can easily jump or step over the raised outer profile 116 to enter the interior surface 104 of the body component 102.

Figure 4:
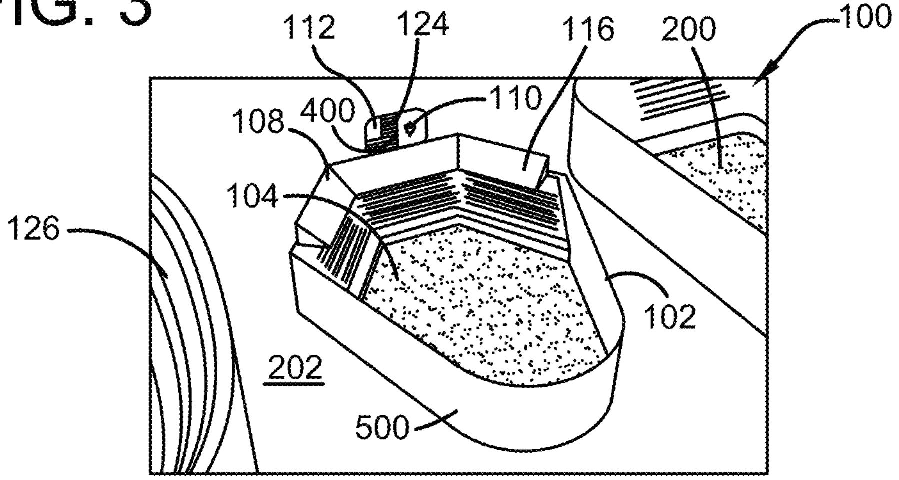
FIG. 4 illustrates a perspective view of one embodiment of the cat litter box device of the present invention showing the stickers or magnets for desired sports teams in accordance with the disclosed architecture.

As shown in FIG. 4, the scoreboard 124 feature found within the interior surface 104 or on the raised outer profile 116 of the body component 102 is made of a plastic or magnetic material 400. This allows for stickers or magnets 110, respectively, to be placed on the scoreboard 124. These stickers or magnets 110 may be any logo, design, ornamentation, etc., for any sports team 112 which is desired by the user 106. The user 106 may also change the stickers or magnets 110 regularly to keep up with whatever team 112 they desire, whether it be a favorite, rival, or simply current team 112. Thus, the stickers or magnets 110 can be easily secured to the device 100 and then easily interchanged, as needed.

Figure 5:
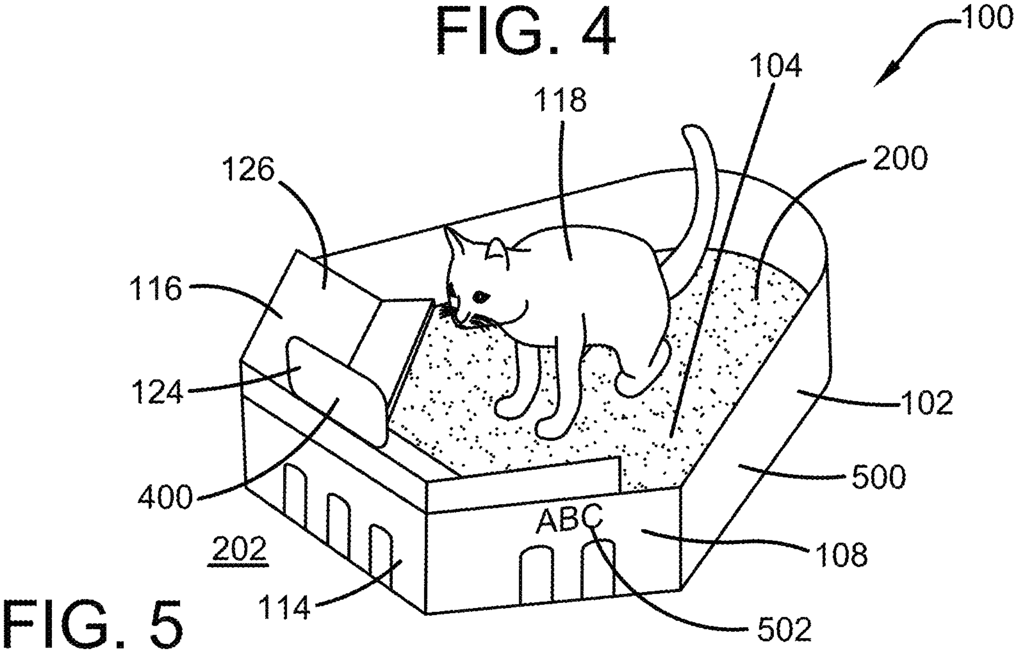
FIG. 5 illustrates a perspective view of one embodiment of the cat litter box device of the present invention in use in accordance with the disclosed architecture.

As shown in FIG. 5, the cat litter box device 100 may be any size or shape as is desired by the user 106, as long as the device 100 is sized and shaped to fit a cat 118 within the interior surface 104 of the body component 102. This cat litter box device 100 may also come in many different sizes to accommodate for many different breeds or sizes of cats 118.

Additionally, the cat litter box device 100 is manufactured from plastic, stainless steel, or other suitable materials 500 as is known in the art, or a combination of such materials 500. Specifically, the cat litter box device 100 can be manufactured from heat-sealable plastic or polymers, such as polypropylene or acrylonitrile-butadiene-styrene (ABS), or any other suitable material as is known in the art, such as, but not limited to, acrylic, polycarbonate, polyethylene, polyethylene terephthalate, polyvinyl chloride, polystyrene, cardboard, etc. Generally, the cat litter box device 100 is also manufactured from a material that is water resistant or waterproof, or comprises a coating that is water resistant or waterproof. Further, the cat litter box device 100 can be made of antibacterial or antimicrobial material or comprises a coating that is antibacterial or antimicrobial.

In yet another embodiment, the cat litter box device 100 comprises a plurality of indicia 502. The body component 102 of the device 100 may include advertising, a trademark, or other letters, designs, or characters, printed, painted, stamped, or integrated into the body component 102, or any other indicia 502 as is known in the art. Specifically, any suitable indicia 502 as is known in the art can be included, such as, but not limited to, patterns, logos, emblems, images, symbols, designs, letters, words, characters, animals, advertisements, brands, etc., that may or may not be sports, cat, or brand related.

Figure 6:
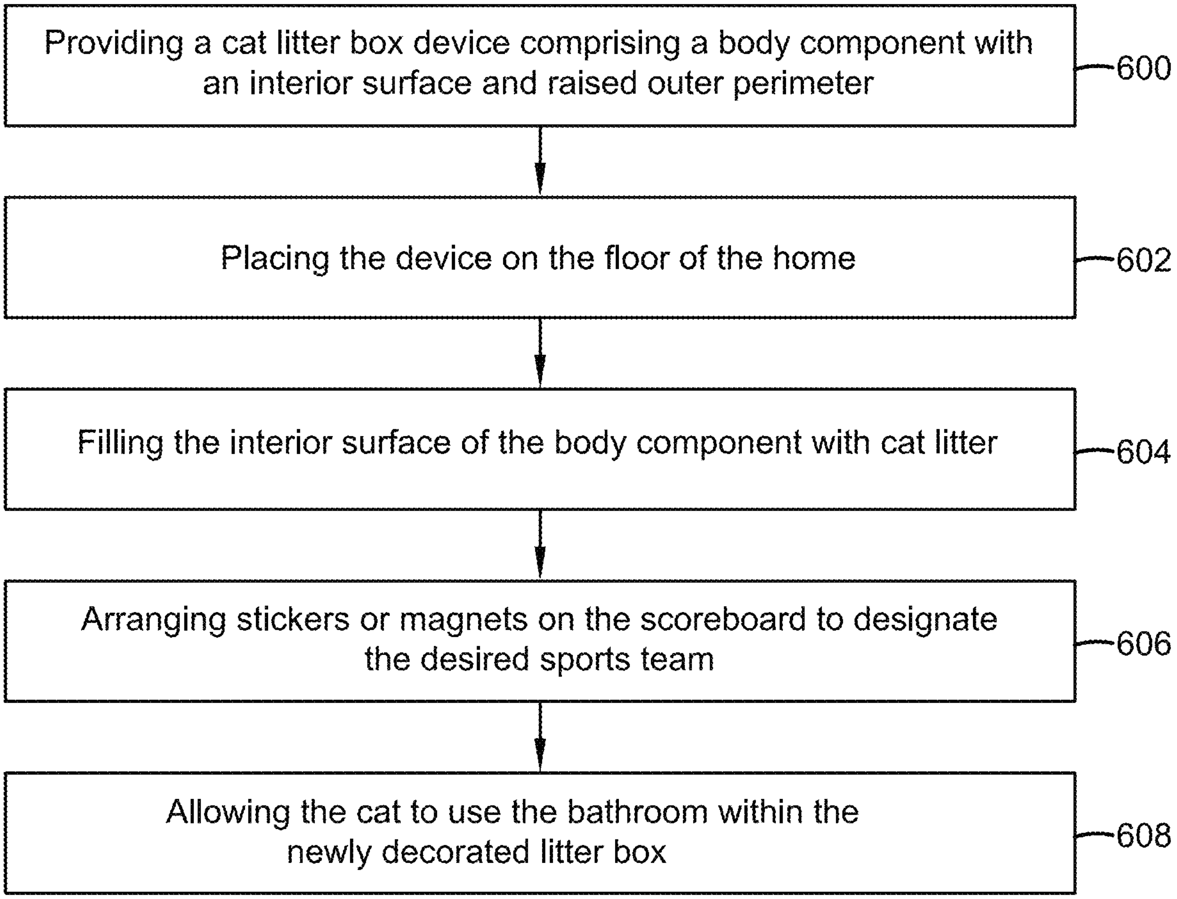
FIG. 6 illustrates a flowchart showing the method of decorating a cat litter box in accordance with the disclosed architecture.

FIG. 6 illustrates a flowchart of the method of decorating a cat litter box. The method includes the steps of at 600, providing a cat litter box device comprising a body component with an interior surface and raised outer perimeter. The method also comprises at 602, placing the device on the floor of the home. Further, the method comprises at 604, filling the interior surface of the body component with cat litter. The method also comprises at 606, arranging stickers or magnets on the scoreboard to designate the desired sports team. Finally, the method comprises at 608, allowing the cat to use the bathroom within the newly decorated litter box.

Certain terms are used throughout the following description and claims to refer to particular features or components. As one skilled in the art will appreciate, different users may refer to the same feature or component by different names. This document does not intend to distinguish between components or features that differ in name but not structure or function. As used herein, "cat litter box device", "litter box device", "cat device", and "device" are interchangeable and refer to the cat litter box device 100 of the present invention.

Notwithstanding the foregoing, the cat litter box device 100 of the present invention can be of any suitable size and configuration as is known in the art without affecting the overall concept of the invention, provided that it accomplishes the above-stated objectives. One of ordinary skill in the art will appreciate that the cat litter box device 100, as shown in FIGS. 1-6 is for illustrative purposes only, and that many other sizes and shapes of the scat litter box device 100 are well within the scope of the present disclosure. Although the dimensions of the cat litter box device 100 are important design parameters for user convenience, the cat litter box device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cat litter box device that provides a user with a litter box decorated as a sports stadium, the cat litter box device comprising:

a body component, wherein the body component is traditionally configured in an ovular shape, or any shape which represents a typical sports stadium or arena; and an interior surface;

wherein the interior surface is indented compared to rest of the body component to sufficiently hold cat litter;

wherein the body component comprises an exterior surface, an interior surface, and a raised outer profile;

wherein the body component comprises traditional aspects of sports stadiums including a field or court area, scoreboards, and bleachers;

wherein the bleachers of the body component comprise the raised outer profile;

wherein the raised outer profile is slightly higher than the rest of the body component, and yet low enough for a cat to step or jump into the interior surface;

wherein a scoreboard feature is found within the interior surface or exterior surface of the cat litter box device;

wherein the scoreboard feature is comprised of a magnetic or plastic material so that stickers or magnets can be placed on the scoreboard feature; and further wherein the body component can be decorated for any specific sports team as is desired by the user.

2. The cat litter box device of claim 1, wherein the stickers or magnets comprise a logo or name of certain sports teams which can be changed or swapped.

3. The cat litter box device of claim 2, wherein the device is comprised of a plastic or stainless steel material or a combination of such materials.

4. The cat litter box device of claim 3 further comprising a plurality of indicia.

5. A cat litter box device that provides a user with a litter box decorated as a sports stadium, the cat litter box device comprising:

a body component configured in a traditionally ovular shape or mimics shape of a specific sport stadium; and an interior surface;

wherein the body component comprises an exterior surface, an interior surface, and a raised outer profile;

wherein the interior surface is indented compared to rest of the body component;

wherein the interior surface comprises a field or court area of a stadium space;

wherein the body component comprises a miniature version of aspects of a traditional stadium including a field or court area, a scoreboard, and bleachers;

wherein the bleachers are raised above the rest of the body component into a raised outer profile;

wherein stickers or magnets can be added to the scoreboard depicting different sports teams; and further wherein the raised outer profile is high enough to keep cat litter within the cat litter box device, but low enough that a cat can step or jump over it if need be.

6. The cat litter box device of claim 5 further comprising a plurality of indicia.

7. The cat litter box device of claim 5, wherein the scoreboard of the body component is comprised of a magnetic or plastic material.

8. The cat litter box device of claim 5, wherein the body component can be any size or shape as is desired as long as it can fit a cat within the interior surface.

9. The cat litter box device of claim 8, wherein the body component can vary in size to accommodate for different cat breeds.

10. The cat litter box device of claim 9, wherein the cat litter box device is comprised of a plastic or stainless steel material or a combination of such materials.

11. A method of decorating a cat litter box, the method comprising the following steps:

providing a cat litter box device comprising a body component with an interior surface and raised outer perimeter and a scoreboard;

placing the cat litter box device on the floor of a home;

filling the interior surface of the body component with cat litter;

arranging stickers or magnets on the scoreboard to designate the desired sports team; and allowing the cat to use the bathroom within the newly decorated cat litter box.

* * * * *